Nov. 14, 1972          F. MOTTIER          3,702,737
METHOD OF AND ARRANGEMENT FOR EXAMINING MOVING
OBJECTS BY COHERENT LIGHT
Filed Dec. 30, 1970

INVENTOR.
François Mottier
BY
Pierce, Scheffler & Parker
Attorneys

United States Patent Office
3,702,737
Patented Nov. 14, 1972

3,702,737
METHOD OF AND ARRANGEMENT FOR EXAMINING MOVING OBJECTS BY COHERENT LIGHT
Francois Mottier, Zurich, Switzerland, assignor to Aktiengesellschaft Brown Boveri & Cie, Baden, Switzerland
Filed Dec. 30, 1970, Ser. No. 102,697
Claims priority, application Switzerland, Jan. 21, 1970, 793/70
Int. Cl. G01b 9/02, 11/30; G01d
U.S. Cl. 356—109
9 Claims

ABSTRACT OF THE DISCLOSURE

A method of examining a moving object by utilization of coherent light in which the laser produced light is directed onto a diffuser to establish a luminous area of randomly scattered light which then serves to illuminate the surface of the object. Points at rest on the surface of the illuminated object will appear coarsely speckled whereas the speckles will become blurred for those points on the surface which are in movement. By varying the ratio of the luminous area on the diffuser to the distance between said area and the object to be examined, variation of the sensitivity of the method is possible.

Figure 1:
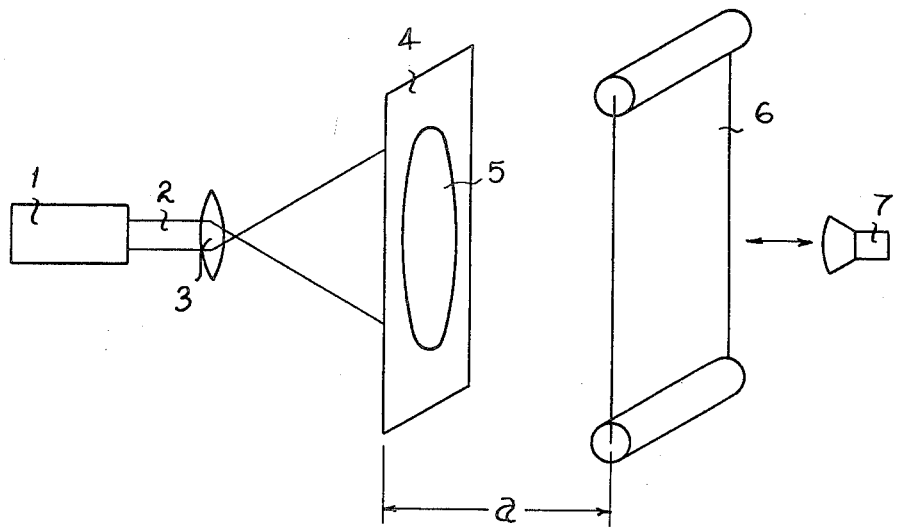

One suitable arrangement by which the method can be performed includes a laser, a lens for expanding the beam of coherent light produced by the laser, an opal glass plate illuminated by the expanded laser beam and the object to be examined illuminated from the opal glass plate. The opal glass plate which functions as a diffuser is located at a distance from the object which is variable so that the ratio of the luminous area which serves as the source of diffusely scattered light for illumination of the object to said distance is adjustable.

---

This invention relates to an improved method of, and an arrangement for, examining moving objects particularly vibrating objects, by means of coherent light.

For the examination of the states of stress and of the wear and tear of machine parts it is very important to know the nodal lines and eventually also the anti-nodes, if any, in the natural vibrations of the part.

For the determination of the latter it was customary heretofore to scan the vibrating object mechanically point by point, which is extremely time-consuming and laborious. A holographic method is also known (J. Opt. Soc. Am. 55 (1965) 1953) which supplies, in addition to the nodal lines, also the curves of equal vibrational amplitude. But this method requires a considerable expenditure for a stable structure, as is customary in holography; moreover, the long measuring time required by the photographic process, which is of the order of about a half hour, is also a disadvantage when using this method.

The general object of this invention is to avoid these disadvantages and to provide a new method, and an arrangement for carrying out this method, with which data about the movement, or the state of rest, of various surface elements of a vibrating object to be examined can be obtained directly either visually or photographically.

This object is achieved by directing coherent light from a suitable source to a diffusely scattering body and illuminating the object to be examined with scattered light from this body. Preferably monochromatic light is used.

It is known (e.g. J. Opt. Soc. Am. 55 (1965), 247) that even objects which are illuminated strictly homogeneously appear highly speckled or granulated or spotty when illuminated with the coherent light of a laser. An explanation for this phenomenon is seen in the fact that coherent light undergoes random phase-shifts when it is scattered from the individual surface elements of the illuminated object, which causes an irregular intensity distribution of the light in the image formed by an optical system. The visually or photographically noticeable spots are mostly termed "speckles." Their size depends on the aperture of the optical imaging system. But, if a scattering body, hence a diffuser, for example a ground glass, a dull white surface or opal glass is brought into the illuminating laser beam, a fine-speckled pattern arises without the necessity of an optical imaging system. An explanation for it can be seen in the fact that the diffuser already effects a random phase-distribution of the transmitted light and thus leads to (local) spatial intensity fluctuations.

If one now brings the object to be examined for its state of motion, according to the invention, into the light scattered from a diffusely scattering body, which thus shows intensity fluctuations in space, the intensity distribution of the scattered light on the illuminated object surface will constantly vary at the points in motion and the time averaged granulation observed visually or photographically in the image of the object surface will disappear. On the other hand, the granulation is preserved at the points of rest, for example, at the points of the nodal lines of the vibrating object. The granulation perceived by the eye will generally be much coarser than that produced by the diffuser, since it depends on the aperture of the optical imaging system.

It thus is possible to directly recognize with the measuring method according to the invention, either visually or photographically, nodal lines or points of rest of moving, particularly vibrating bodies, since points of rest appear coarsely granulated, while moving object points appear practically homogeneously illuminated, or at least much more fine-grained. The points of transition from the coarse granulation to the homogeneous area provide additional data about the magnitude of the object movement at these points since the contrast of the granulation is a unique function of the the amplitude of movement and the geometrical parameters of the set-up.

According to a preferred embodiment of the invention, the ratio of the size of the luminous area of the diffuser that scatters the light for the illumination of the object to be examined to the distance of the object from the luminous area can be varied. This provides the possibility of varying the sensitivity of the method according to the invention. The greater the ratio of the size of the luminous area to the diffuser-object distance, the finer becomes the granulation product by the diffuser and the greater becomes the sensitivity, i.e. the smaller are the movement amplitudes of the object to be examined at which the observed granulation disappears in the image. The movement amplitude at which the transition from the coarse granulation to the homogeneous surface appears can be selected within wide limits, and ranges from a few light wavelengths up to several tenths of a millimeter.

If one examines an object, according to the invention, with different sensitivities, it is possible to obtain an image of the amplitude distribution of the vibrating body in the determination of the points of transition from the coarse granulation to the homogeneous luminous area. A scale can be established simply by calibrating the device for carrying out the method according to the invention. By suitable selection of the sensitivity it is also possible to separate two differently strong movements of the object from each other. For example, if a vigorously vibrating machine part on a lightly wavering structure is to be examined, the sensitivity is selected just so high that the granulation is not yet made to disappear by the wavering structure so that the superimposed vibration stands out clearly by its finer granulation.

An advantageous arrangement for carrying out the method according to the invention consists in producing the scattered light by the illumination of a ground or opal glass plate with light from a laser beam which has been expanded by a lens. The expansion may be effected by locating the glass plate along the optical axis at a distance from a diverging or converging lens which is greater than the focal length. The object to be examined is then brought into the path of the light passing through the diffuser, i.e. the ground or opal glass plate. It is also possible to illuminate a dull white surface by the expanded beam of coherent light and to position the object to be examined in the light rays scattered by reflection from said surface. For varying the sensitivity in the above mentioned arrangement by varying the diameter of the luminous area on the diffuser it is possible either to replace one lens by another having a different focal length or to change the lens-diffuser distance. A variation of the diffuser-object distance also effects a variation of the sensitivity.

Figure 2:
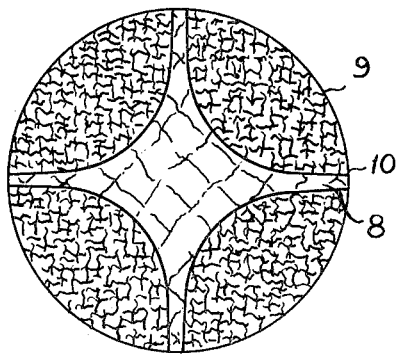

Other advantages and features of the invention will become more apparent from the following detailed description of the method as related to one suitable embodiment illustrated in the accompanying drawings wherein:

FIG. 1 is a schematic view of the arrangement of the laser beam, lens, diffuser and diffusely illuminated object, in the form of an elongated plate driven by an oscillator, and FIG. 2 shows the image pattern of a vibrating circular plate also illuminated according to the invention.

With reference now to FIG. 1, the coherent light beam 2 leaving the laser 1 is passed through a converging lens 3 so that a luminous area 5 is obtained on a ground or opal glass plate 4 arranged on the optical axis beyond the focal length of lens 3, this area 5 serving as a source of scattered light i.e. a radiating diffuser, which illuminates the vibrating object to be examined, e.g. a plate 6 arranged at a distance $a$ from the diffuser, the plate being clamped at two opposite sides and set into vibration by an oscillator 7. Instead of a converging lens 3 one can naturally likewise utilize a diverging lens.

The vibrating plate 6 in this way illuminated by scattered light from the luminous area 5 can now be viewed visually, or it can be photographed. At surface points of rest on the object e.g. points which establish points lines, one obtains a coarse-granulated image, whereas at points where the elements of the plate surface are in motion the granulation disappears and the plate seems practically homogeneous or at least much more fine-grained.

The image of a circular metal plate stimulated to natural vibrations is shown in FIG. 2. It is reminiscent of the known Chladni figures. The surface elements 9 vary from fine-grained to homogeneous and thus indicate points of motion. The surface elements 8, however, are coarsely granulated and indicate points of rest, hence of nodal lines. The lines 10 indicate the locus of points of transition from coarse granulation to the homogeneous appearing surfaces, and are displaced to the outside with unchanged state of vibration of the object if the sensitivity of the arrangement is reduced, and vice versa. For a fixed geometry they are unique functions of the movement amplitude, as mentioned above.

By means of the method according to the invention it is possible to draw the nodal lines directly on the object viewed.

I claim:

1. The method of examining a moving object by utilization of coherent light which comprises the steps of scattering a beam of coherent light on a diffusely scattering surface to produce a luminous area of randomly scattered light and illuminating the moving object from said luminous area.

2. Apparatus for examining a moving object by utilization of coherent light which comprises means producing a beam of coherent light, and means expanding said light beam and directing it onto a diffuser to produce thereon aluminous area of randomly scattered light, said moving object being so positioned as to be illuminated by said luminous area of said diffuser.

3. Apparatus for examining a moving object by utilization of coherent light which comprises, means producing a beam of coherent light, a ground glass plate or opal glass plate located along the axis of said beam, and a lens located in the path of said beam ahead of said ground glass plate or opal glass plate for expanding the beam to establish a luminous area on said ground glass plate or opal glass plate, the moving object being so positioned as to be illuminated by the luminous area on said ground glass plate or opal glass plate.

4. Apparatus for examining a moving object by utilization of coherent light as defined in claim 3 and which includes means for varying the size of said luminous area on said ground glass plate or opal glass plate thereby to vary the sensitivity of the apparatus.

5. Apparatus for examining a moving object by utilization of coherent light as defined in claim 4 wherein said means for varying the size of the luminous area on said ground glass plate or opal glass plate is constituted by means for varying the distance between said lens and said ground glass plate or opal glass plate.

6. Apparatus for examining a moving object by utilization of coherent light as defined in claim 4 wherein interchangeable lenses having different focal lengths are provided for varying the size of the luminous area on said ground glass plate or opal glass plate.

7. Apparatus for examining a moving object by utilization of coherent light as defined in claim 3 and which further includes means for varying the distance between said ground glass plate or opal glass plate and the moving object for changing the sensitivity of the apparatus.

8. Apparatus for examining a moving object by utilization of coherent light as defined in claim 3 wherein said ground glass plate or opal glass plate are passed in transmission by the beam of coherent light illuminating the object to be examined after being scattered randomly at said ground or opal glass plate.

9. Apparatus for examining a moving object by utilization of coherent light as defined in claim 2 wherein a dull white surface serves as a diffuser from which the expanded beam of coherent light is reflected to illuminate the object to be examined.

References Cited

"Coherent Light," Cutler; International Science and Technology, September 1963.

RONALD L. WIBERT, Primary Examiner

C. CLARK, Assistant Examiner

U.S. Cl. X.R.

73—71.3; 356—120, 237

UNITED STATES PATENT OFFICE
CERTIFICATE OF CORRECTION

Patent No.  3,702,737      Dated  November 14, 1972

Inventor(s)  FRANCOIS MOTTIER

It is certified that error appears in the above-identified patent and that said Letters Patent are hereby corrected as shown below:

Col. 1, line 49, after "(1965)" change "1953" to -- 1593 --; col. 2, line 48, "product" should read -- produced --; col. 3, line 43, delete "points", second occurrence, and insert -- nodal --; col. 4, line 10, "aluminous" should read -- a luminous --.

Signed and sealed this 15th day of May 1973.

(SEAL)
Attest:

EDWARD M. FLETCHER, JR.            ROBERT GOTTSCHALK
Attesting Officer                  Commissioner of Patents